(12) United States Patent
Kim

(10) Patent No.: US 12,071,008 B2
(45) Date of Patent: Aug. 27, 2024

(54) APPARATUS FOR INPUTTING VEHICLE COMMAND, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventor: Jong Hyuk Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 961 days.

(21) Appl. No.: 17/065,873

(22) Filed: Oct. 8, 2020

(65) Prior Publication Data

US 2021/0394614 A1    Dec. 23, 2021

(30) Foreign Application Priority Data

Jun. 22, 2020   (KR) .................. 10-2020-0075888

(51) Int. Cl.
  *B60K 35/00*   (2024.01)
  *B62D 1/06*    (2006.01)
  *G10L 15/22*   (2006.01)
  *B60K 35/10*   (2024.01)
  *B60K 35/28*   (2024.01)
  *B60K 35/60*   (2024.01)

(52) U.S. Cl.
  CPC .......... *B60K 35/00* (2013.01); *B62D 1/06* (2013.01); *G10L 15/22* (2013.01); *B60K 35/10* (2024.01); *B60K 35/28* (2024.01); *B60K 35/60* (2024.01); *B60K 2360/148* (2024.01); *B60K 2360/178* (2024.01); *B60K 2360/782* (2024.01); *G10L 2015/223* (2013.01)

(58) Field of Classification Search
  CPC ..... B62D 1/06; G10L 15/22; G10L 2015/223; B60K 2370/782; B60K 2370/178; B60K 2370/12; B60K 2370/148
  See application file for complete search history.

(56) References Cited

U.S. PATENT DOCUMENTS

| | | | | |
|---|---|---|---|---|
| 5,014,801 A | * | 5/1991 | Hirose ............... | B62D 7/1581 701/43 |
| 9,007,190 B2 | * | 4/2015 | Bosch ................ | G06F 3/045 74/552 |
| 11,203,372 B2 | * | 12/2021 | Aerts ................ | G06F 3/016 |
| 2013/0325264 A1 | * | 12/2013 | Alcazar .............. | B62D 1/181 701/49 |
| 2014/0081521 A1 | * | 3/2014 | Frojdh ............... | G06F 3/04883 701/36 |

(Continued)

FOREIGN PATENT DOCUMENTS

KR    10-2019-0116767 A    10/2019

*Primary Examiner* — Gertrude Arthur Jeanglaude
(74) *Attorney, Agent, or Firm* — MORGAN, LEWIS & BOCKIUS LLP

(57) ABSTRACT

An apparatus for inputting a vehicle command, a system having the same and method thereof are provided. The apparatus for inputting the vehicle command includes a storage configured to an algorithm and a processor configured to execute the algorithm to recognize a motion of a user based on an intensity of force applied to a steering wheel, and to recognize and execute the vehicle command based on the motion of the user. The storage is further configured to store data processed by the processor.

19 Claims, 9 Drawing Sheets

(56) References Cited

U.S. PATENT DOCUMENTS

2016/0270988 A1* 9/2016 Diaz-Flores ......... A61G 5/1024
2018/0251146 A1* 9/2018 Boittiaux ................. B62D 1/10
2018/0326851 A1* 11/2018 Kim ....................... B60K 35/60

* cited by examiner

APPARATUS FOR INPUTTING VEHICLE COMMAND, SYSTEM HAVING THE SAME AND METHOD THEREOF

CROSS-REFERENCE TO RELATED APPLICATION

This application claims the benefit of priority to Korean Patent Application No. 10-2020-0075888, filed in the Korean Intellectual Property Office on Jun. 22, 2020, the entire contents of which are incorporated herein by reference.

TECHNICAL FIELD

The present disclosure relates to an apparatus for inputting a vehicle command, a system having the same, and a method, and more particularly, relates to a technology of providing a vehicle service by measuring force applied to a steering wheel.

BACKGROUND

Vehicles are equipped with an air conditioner to provide a comfortable driving environment to a driver, or Audio Video Navigation (AVN) to provide the convenience in the driving of the driver and audiovisual enjoyment.

In general, an input device to operate such an air conditioner or AVN is provided separately in the center fascia of the vehicle. Accordingly, the driver has to move the sight, which faces the front, of the driver to the input device and has to move a hand from the steering wheel to the input device, to manipulate the air conditioner or the AVN during driving, As described above, the manipulating of the air conditioner or the AVN during the driving of a vehicle makes the driver disperse the concentration and neglect facing the front, thereby increasing the probability that traffic accidents occur.

To reduce the accident risk resulting from the manipulating of the air conditioner or the AVN, a remote controller may be provided in the steering wheel. However, the driver needs to move the sight in order to find a manipulator for a desired input or needs to fumble around to find the manipulator, which makes the driver pay no attention to driving and degrades the convenience of the driver.

Accordingly, a technology has been developed to allow the driver to perform a desired manipulation by tapping or scratching the steering wheel or to provide a vehicle service by inputting a voice keyword. However, when the driver listens to music or opens a window, an erroneous input may be made due to surrounding noise.

SUMMARY

The present disclosure has been made to solve the above-mentioned problems occurring in the prior art while advantages achieved by the prior art are maintained intact.

An aspect of the present disclosure provides an apparatus for inputting a vehicle command, capable of apparently determining the intent of a user, as a user to exactly input the vehicle command without an additional hand motion while holding a steering wheel for a vehicle, a system having the same and a method thereof.

An aspect of the present disclosure provides an apparatus for inputting a vehicle command, capable of enhancing the safety of a vehicle by allowing a user to stop or restart inputting the vehicle command, when inputting the vehicle command through a steering wheel and when a signal related to vehicle safety or danger is generated, a system having the same and a method thereof.

The technical problems to be solved by the present inventive concept are not limited to the aforementioned problems, and any other technical problems not mentioned herein will be clearly understood from the following description by those skilled in the art to which the present disclosure pertains.

According to another aspect of the present disclosure, an apparatus for inputting a vehicle command may include a storage configured to store an algorithm and a processor configured to execute the algorithm to recognize a motion of a user based on an intensity of force applied to a steering wheel, and to recognize and execute the vehicle command based on the motion of the user. The storage may be further configured to store data processed by the processor.

According to an embodiment, the processor may include perform at least one of starting a voice recognition service, ending the voice recognition service, controlling an operation and a level of a vehicle device, or responding to the voice recognition service, based on the motion of the user.

According to an embodiment, the motion of the user may include at least one of a holding motion, a grasping motion, a pushing motion, a pulling motion, a motion of holding one side, or a motion of holding in a preset pattern.

According to an embodiment, the processor may include recognize the steering wheel as being in a holding state in which the steering wheel is held by a hand of the user, when force applied to an inner portion or an outer portion of the steering wheel satisfies a preset first condition.

According to an embodiment, the processor may recognize the steering wheel as being in the holding state in which the steering wheel is held by the hand of the user, when the force applied to the inner portion or the outer portion of the steering wheel is sensed through both hands or one hand.

According to an embodiment, the processor may recognize the steering wheel as being in a grasping state in which the steering wheel is grasped by the hand of the user, when force, which is simultaneously applied to the inner portion and the outer portion of the steering wheel by both hands, satisfies a preset second condition.

According to an embodiment, the second condition may be set to have a value greater than the first condition in intensity of the force.

According to an embodiment, the processor may perform at least one of starting a voice recognition service, ending the voice recognition service, controlling an operation and a level of a vehicle device, or responding to the voice recognition service based on the motion of the user, when the steering wheel is recognized as being in the grasping state.

According to an embodiment, the processor may end a function or a service, which is being performed, when the steering wheel is recognized as being in the grasping state.

According to an embodiment, the processor may recognize the motion of the user as a pulling motion, when force applied to an inner portion of the steering wheel is greater than force applied to an outer portion of the steering wheel, and recognize the motion of the user as a pushing motion, when the force applied to the outer portion of the steering wheel is greater than the force applied to the inner portion of the steering wheel.

According to an embodiment, the processor may recognize the pulling motion and the pushing motion by matching the pulling motion and the pushing motion with "Yes" or "No" in a voice recognition service.

According to an embodiment, the processor may perform level control in a state that grasping one side of the steering wheel is performed.

According to an embodiment, the processor may perform level-down control when the grasping of the one side of the steering wheel is performed, and perform level up control when grasping another side of the steering wheel opposite to the one side is performed.

According to an embodiment, the level control may include at least one of volume control, screen brightness control, lighting control, sunroof open control, window open control, or album flip control.

According to an embodiment, the processor may perform a control operation to stop or restart inputting the vehicle command through the steering wheel, when a signal related to vehicle safety or danger is generated or when a steering wheel input value for sudden acceleration/deceleration or sudden rotation is sharply increased in inputting the vehicle command through the steering wheel.

According to an embodiment, the processor may perform a control operation to output a warning when at least one holding motion is not recognized with respect to the steering wheel.

According to an embodiment, the processor may register a condition for each motion of the user by setting the condition based on the intensity of force applied to the steering wheel with respect to the motion of the user.

According to an embodiment, the processor may set the condition as a constant or a section.

According to an embodiment, the processor may correct a condition registered for a holding motion of the motion of the user, based on the condition registered with respect to each motion of the user and a preset weight.

According to another embodiment of the present disclosure, a vehicle system may include a steering wheel of a vehicle, a pressure sensor to sense pressure applied to the steering wheel, and a vehicle command input apparatus to recognize a motion of a user based on an output of the pressure sensor, and to recognize and execute a vehicle command based on the motion of the user.

According to an embodiment, the pressure sensor may include a first sensor mounted at an inner portion of the steering wheel, and a second sensor mounted at an outer portion of the steering wheel.

According to another embodiment of the present disclosure, a method for inputting a vehicle command may include sensing intensity of force applied to a steering wheel, recognizing a motion of a user based on the intensity of the force applied to the steering wheel, and executing the vehicle command by recognizing the vehicle command based on the motion of the user.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
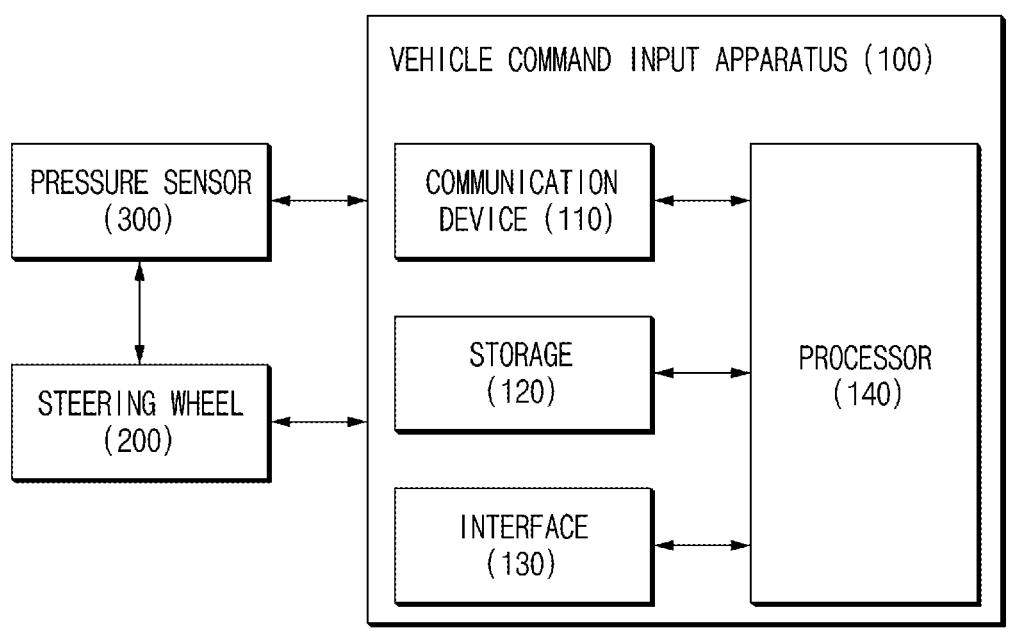
FIG. 1 is a block diagram illustrating a structure of a vehicle system including an apparatus for inputting a vehicle command, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

Figure 2:
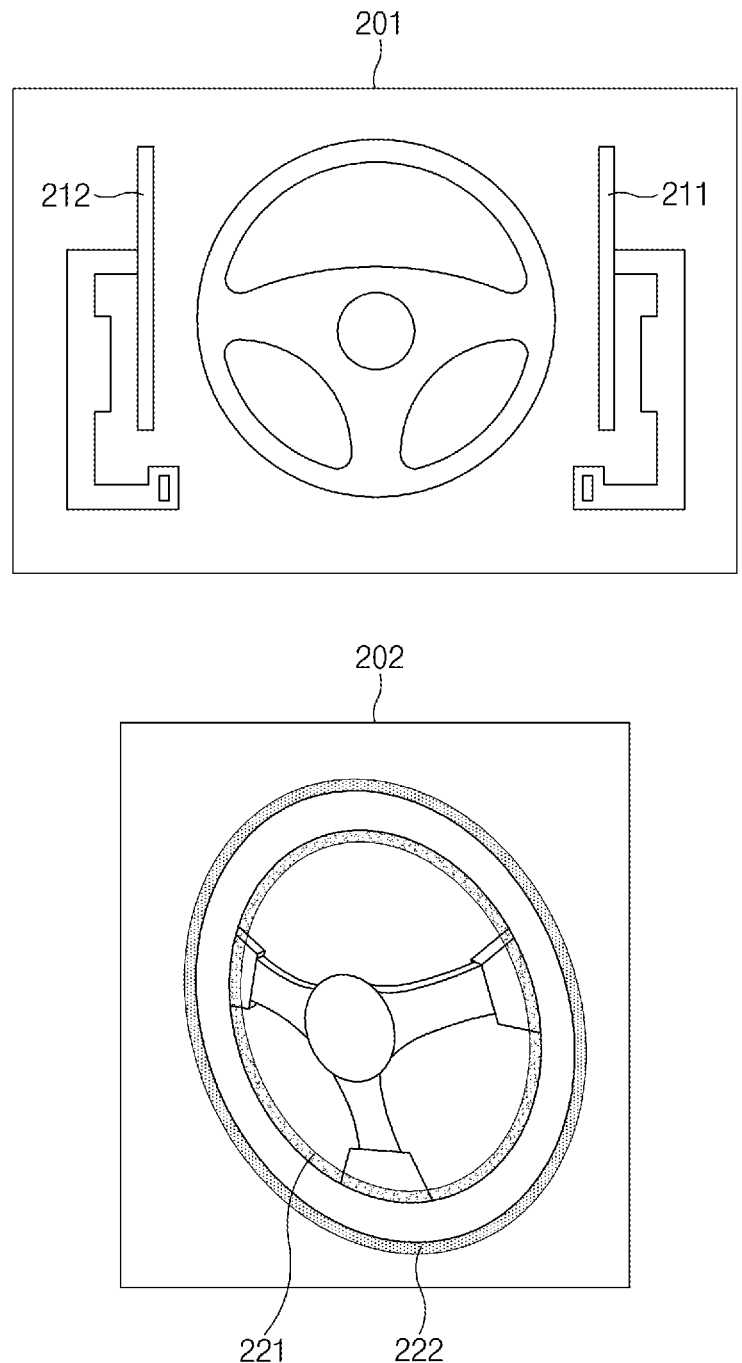
FIG. 2 is a view illustrating a showing of a position of a pressure sensor of a steering wheel, according to an embodiment of the present disclosure.

FIG. 1 is a block diagram illustrating a structure of a vehicle system including an apparatus for inputting a vehicle command, according to an embodiment of the present disclosure, and FIG. 2 is a view illustrating a showing of a position of a pressure sensor of a steering wheel, according to an embodiment of the present disclosure.

Referring to FIG. 1, according to an embodiment of the present disclosure, an apparatus (vehicle command input apparatus) 100 for inputting a vehicle command may be implemented inside a vehicle. In this case, the vehicle command input apparatus 100 may be formed integrally with the internal control units of the vehicle or may be implemented separately from the internal control units of the vehicle to be connected with the internal control units of the vehicle through a separate connector.

A vehicle system may include the vehicle command input apparatus 100, a steering wheel 200 for steering control of the vehicle, and a pressure sensor 300.

The vehicle command input apparatus 100 may recognize the motion (gesture) of the user depending on the intensity of force applied to the steering wheel 200 and recognize and execute the vehicle command based on the motion of the user.

The vehicle command input apparatus 100 may include a communication device 110, a storage 120, an interface 130, and a processor 140.

The communication device 110 is a hardware device implemented with various electronic circuits to transmit and receive a signal through wireless or wired connection. According to the present disclosure, the communication device 110 may perform a network communication technology inside the vehicle. In this case, the vehicle network communication technology may include a controller area network (CAN) communication technology, a local interconnect network (LIN) communication technology, or a FlexRay communication technology, and in-vehicle communication may be performed through the above communication technology.

For an example, the communication device 110 makes communication with the steering wheel 200 and the pressure sensor 300, and may make communication with the storage 120, the interface 130, and the processor 140, which are components in the vehicle command input apparatus 100.

For example, the communication device 110 may receive a signal related to safety or risk from components inside the vehicle and may provide the signal to the processor 140. In other words, the communication device 110 may receive an Emergency stop signaling (ESS) signal, a sudden braking generation function signal from an Anti-Lock Braking System (ABS), a signal related to the collision risk with a front vehicle from the Forward Collision-Avoidance Assist (FCA), a signal related to a function of controlling an unstable vehicle posture from Electronic Stability Control (ESC) or a rear gear signal to be provided to the processor 140.

In addition, the communication device 110 may receive at least one of a speeding, long-term speeding, sudden acceleration, sudden start, sudden braking, sudden stop, sudden left turn, sudden right turn, sudden U-turn turn, sudden passing, or sudden change of course signal from the components inside the vehicle and provide the at least one signal to the processor 140.

In addition, the communication device 110 may receive pressure information sensed by the pressure sensor 300 and provide the pressure information to the processor 140 or the storage 120.

The storage 120 may store, as a result sensed by the pressure sensor 300, data obtained by the processor 140, and data and/or an algorithm necessary for the processor 140 to operate. For example, the storage 120 may store data and/or algorithms for voice recognition.

For example, the storage 120 may store a condition depending on the intensity of force for recognizing the motion of the user and information on the motion of the user for each condition. In this case, the condition depending on the intensity of the force may be preset and stored based on the experimental value, and the condition may be set as a constant or a section.

In addition, the storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The interface 130 may include an input device to receive a control command from a user and an output device to output the operation state and the operation result of the vehicle command input apparatus 100.

The input device may include a key button, a mouse, a joystick, a jog shuttle, and/or a stylus pen, and may include a soft key implemented on a display. According to the present disclosure, the input device may include a microphone for voice recognition.

The output device may include the display and may include a voice output device such as a speaker for outputting a voice recognition result. For example, the output device may be controlled by the processor 140 to output a warning when the hand of the user does not hold the steering wheel.

The display of the output device may include a touch sensor such as a touch film, a touch sheet, a touch pad, or the like, and the display may operate as a touch screen, and may be implemented in the integral type of the input device and the output device. In this case, the display may include at least one of a liquid crystal display (LCD), a thin film transistor-liquid crystal display (TFT LCD), an organic light-emitting diode (OLED), a flexible display, a field emission display (FED), or a three dimensional display (3D display).

The processor 140 may be electrically connected with the communication device 110, the storage 120, or the interface 130, and the like, may electrically control each component, and may be an electric circuit that executes software commands. In one example, the software commands may be stored in the storage 120. Accordingly, the processor 140 may perform various data processing and calculation, to be described below. The processor 140 may be, for example, an electronic control unit (ECU), a micro controller unit (MCU), or another lower-level controller mounted in the vehicle.

Figure 3:
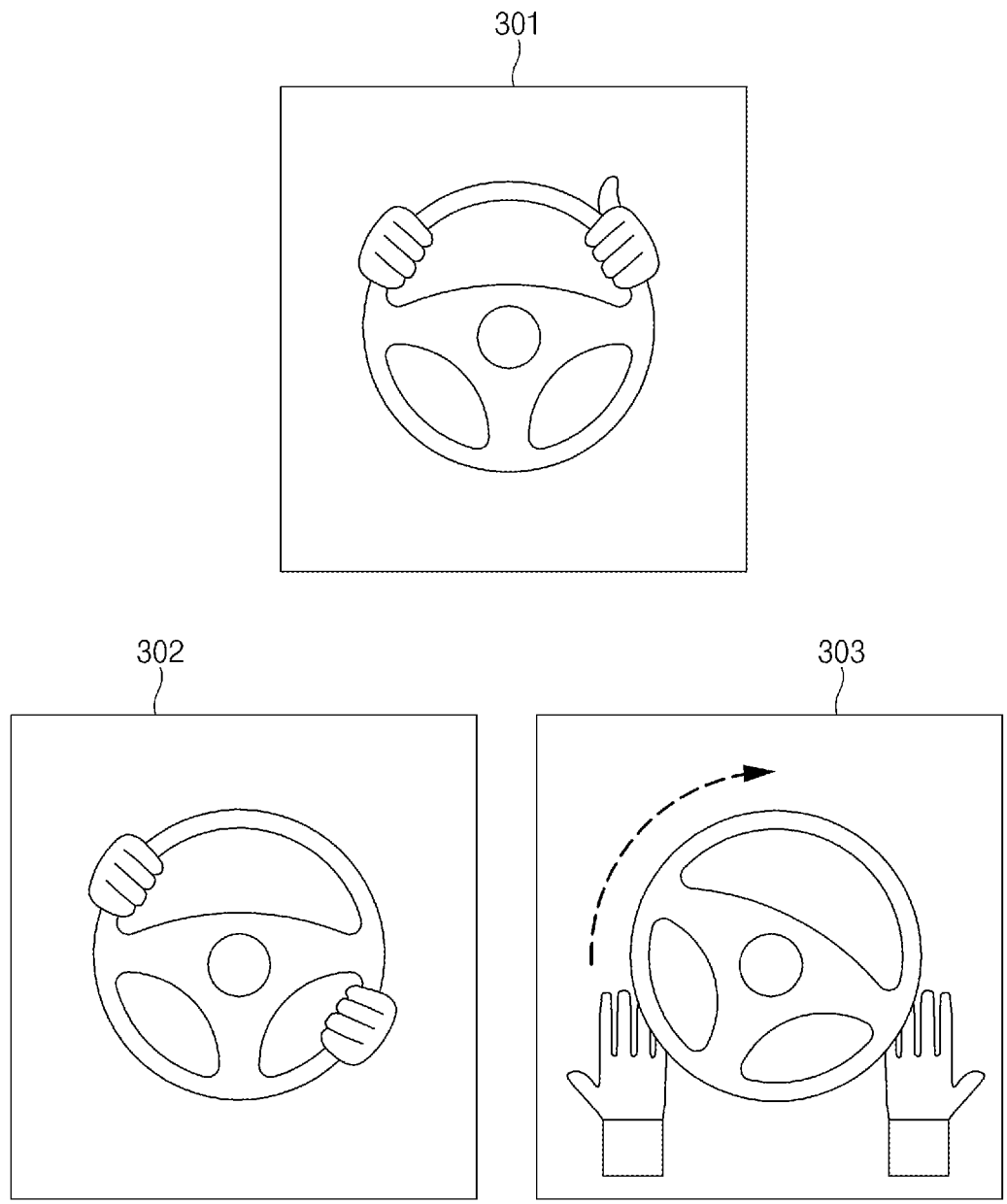
FIG. 3 is a view illustrating a showing of a position of a user hand on a steering wheel, according to an embodiment of the present disclosure.

The processor 140 may recognize the motion (gesture) of the user depending on the intensity of force, which is applied to the steering wheel 200 and sensed by the pressure sensor 300, and may recognize and execute the vehicle command based on the motion of the user. The processor 140 may identify the motion of the user depending on the intensity of force applied by one hand or both hands holding the steering wheel 200 as illustrated in FIG. 3. FIG. 3 is a view illustrating a showing of a position of a hand on a steering wheel, according to an embodiment of the present disclosure.

The pressure sensor 300 basically performs a sensing operation on the assumption that the driver uses a right-half part and a left-half part of the steering wheel with both hands.

The pressure sensor 300 is mounted on an inner portion and an outer portion of the steering wheel 200 to sense pressure when the user holds and rotates the steering wheel 200 as in reference numeral 303 of FIG. 3. In this case, even if only one of an inner sensor or an outer sensor is recognized through the pressure sensor 300, the apparatus 100 may recognize that the user holds the steering wheel 200. As in reference numeral 301 of FIG. 3, both hands of the user holds the upper side of the steering wheel 200, and, as in reference numeral 302, the right hand holds the upper side of the steering wheel 200 and the left hand holds the opposite side. In other words, the pressure sensor 300 may sense the steering wheel 200 as being held, even though only any one hand of the user holds the steering wheel 200 regardless of positions of both hands. To the contrary, when the pressure is not sensed by any one of the inner sensor and the outer sensor, the pressure sensor 300 may sense that the user does not hold the steering wheel 200. Accordingly, when the user does not hold the steering wheel 200 with any one hand, the apparatus 100 may output a warning to guide that the user holds the steering wheel 200.

Meanwhile, the motion of the user may include at least one of a holding motion, a grasping motion, a pushing motion, a pulling motion, a motion of holding one side, or a motion of holding in a preset pattern. The details of each motion will be described later with reference to FIG. 4.

The processor 140 may perform at least one of starting a voice recognition service, ending the voice recognition service, controlling an operation and a level of a vehicle device, or responding to the voice recognition service, based on the motion of the user.

The processor 140 may recognize the steering wheel as being in the state of a holding motion in which the steering wheel 200 is held by a hand of the user, when force applied to an inner portion or an outer portion of the steering wheel 200 satisfies a preset first condition, and may recognize the steering wheel 200 as being in the state of the holding motion in which the steering wheel 200 is held by the hand of the user, when the force applied to the inner portion or the outer portion of the steering wheel 200 is sensed by both hands or one hand.

The processor 140 may recognize the steering wheel as being in the state of a grasping motion in which the steering wheel is grasped by the hand of the user, when the force simultaneously applied to the inner portion and the outer portion of the steering wheel 200 by both hands, satisfies a preset second condition. In this case, the first condition in the holding motion may be set to have a value smaller than the second condition in the grasping motion in terms of intensity of force.

The processor 140 may perform at least one of starting a voice recognition service, ending the voice recognition service, controlling an operation and a level of a vehicle device, or responding to the voice recognition service, based on the motion of the user, when the steering wheel is recognized as being in the state of the grasping motion based on the steering wheel 200.

The processor 140 may end a function or a service, which is being executed, when the steering wheel is recognized as being in the state of the grasping motion. For example, the processor 140 may transmit a signal for starting the voice recognition service and may start the voice recognition service. For example, the processor 140 may end the voice recognition service when the steering wheel is recognized as being in the state of the grasping motion after providing the voice recognition service.

The processor 140 may recognize the steering wheel as being in the state of a pulling motion, when force applied to an inner portion of the steering wheel 200 is greater than force applied to an outer portion of the steering wheel 200, and may recognize the steering wheel as being in the state of a pushing motion, when the force applied to the outer portion of the steering wheel 200 is greater than the force applied to the inner portion of the steering wheel 200.

The processor 140 may recognize the pulling motion and the pushing motion by matching the pulling motion and the pushing motion with "Yes" or "No" in the voice recognition service. For example, the processor 140 may recognize the intent of the user as "No" when the pulling motion is recognized, and may recognize the intent of the user as "Yes" when the pushing motion is recognized.

The processor 140 may perform level control in a state that grasping one side of the steering wheel is performed. In this case, the level control may include at least one of volume control, screen brightness control, lighting control, sunroof open control, window open control, or album flip control, but the present disclosure is not limited thereto. For example, the level control may include control of all devices capable of performing the level control inside the vehicle.

The processor 140 may perform level down control when the grasping of one side of the steering wheel 299 is performed, and perform level up control when grasping an opposite side of the steering wheel 200 is performed.

The processor 140 may perform a control operation to stop or restart inputting the vehicle command through the steering wheel 200, when a signal related to vehicle safety or danger is generated or when a steering wheel input value for sudden acceleration/deceleration or sudden rotation is sharply increased in inputting the vehicle command through the steering wheel 200. In other words, the processor 140 may stop a gesture detection operation using the steering wheel 200 through interlocking with in-vehicle devices under the situation in which dangerous matters occur or laws are violated.

The processor 140 may determine that a dangerous situation occurs, when at least one of an Emergency stop signaling (ESS) signal, a sudden braking generation function signal from an Anti-Lock Braking System (ABS), a signal related to the collision risk with a front vehicle from the Forward Collision-Avoidance Assist (FCA), a signal related to a function of controlling an unstable vehicle posture from Electronic Stability Control (ESC), or a rear gear signal is generated.

In addition, the processor 140 may stop a gesture detection operation using the steering wheel 200, when at least one of a speeding, long-term speeding, sudden acceleration, sudden start, sudden braking, sudden stop, sudden left turn, sudden right turn, sudden U-turn turn, sudden passing, or sudden change of course signal is generated The processor 140 may determine that the user does not hold the steering wheel, when at least one holding motion is not recognized with respect to the steering wheel 200, and may output a warning to guide that the user holds the steering wheel 200.

The processor 140 may register a condition for each motion of the user by setting a condition based on an intensity of force applied to the steering wheel with respect to the motion of the user, and may set the condition as a constant or a section. In this case, the registration of the condition for each motion of the user will be described later with reference to table 1.

The processor 140 may correct a condition registered for a holding motion of the motion of the user using the condition registered with respect to each motion of the user and a preset weight. In this case, the registration of the condition for each motion of the user will be described later with reference to table 2. The processor 140 may correct the condition registered for the holding motion of the motion of the user using the condition registered with respect to each motion of the user and the preset weight, and the preset weight may be, in advance, set based on an experiment value.

The pressure sensor 300 may be mounted in an inner portion and an outer portion of the steering wheel 200. Referring to reference numeral 201 of FIG. 2, two pressure sensors 211 and 212 are provided. As illustrated in reference numeral 202 of FIG. 2, the two pressure sensors 211 and 212 may be mounted on an inner portion 221 and an outer portion 222 of the steering wheel 200.

Figure 4:
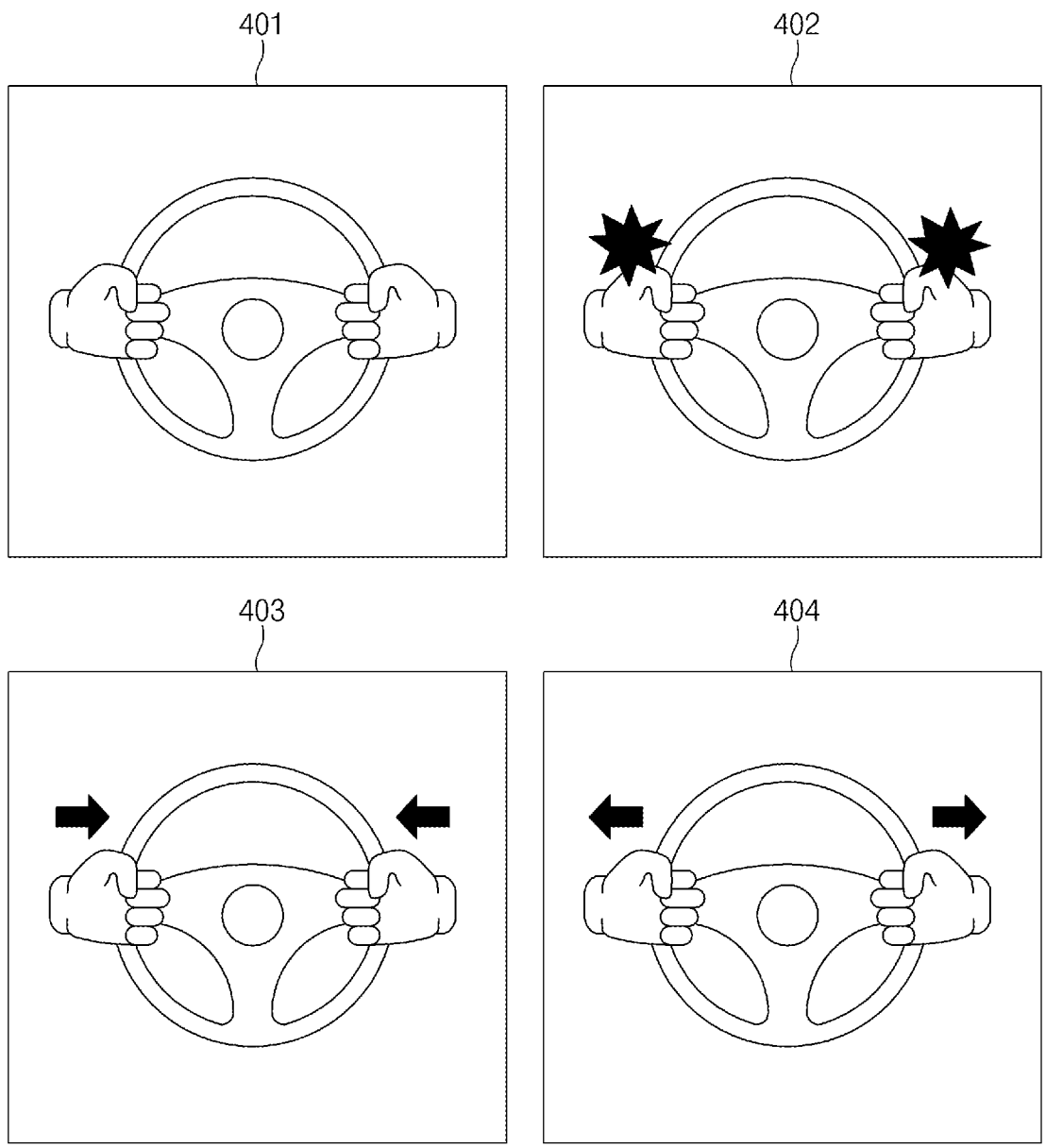
FIG. 4 is a view illustrating a showing of a gesture, according to an embodiment of the present disclosure.

FIG. 4 is a view illustrating a showing of a gesture, according to an embodiment of the present disclosure.

In FIG. 4, reference numeral 401 illustrates a "holding" motion, reference numeral 402 illustrates a "grasping" motion, reference numeral 403 illustrates a "pushing" motion, and reference numeral 404 illustrates a "pulling" motion. Although FIG. 4 illustrates that four motions of holding, grasping, pushing, and pulling motions are input, the present disclosure is not limited thereto. For example, various motions may be recognized. For example, the apparatus 100 may recognize a motion, start a voice recognition service, or provide a predefined service by holding a steering wheel using a specific pattern such as Morse code.

The apparatus 100 may register force corresponding to the holding, grasping, pushing, and pulling motions in advance. In other words, the device 100 may register the inner force applied to the inner portion of the steering wheel and the outer force applied to the outer portion of the steering wheel, and may compare the force with force applied to the steering wheel by the user thereafter to recognize the motion. In this case, the inner force and the outer force may be registered as a specific force value (constant) or a section to be forced. For example, the section to be forced may be classified into 10 sections. The motion is identified and recognized depending on a section to which the force of holding the steering wheel belongs. The 10 sections may be set with force gradually increased from a first section toward a tenth section. In this case, the section to be forced may be more finely divided or may be divided in larger-size unit.

The apparatus 100 recognizes the motion of the user as the holding motion when normal force is applied to one of the inner portion or the outer portion of the steering wheel 200 or simultaneously applied to the inner portion and the outer portion of the steering wheel 200. In this case, the normal force refers to force having the intensity in a preset range, and may be determined based on an experimental value in advance. The apparatus 100 may register the motion of the user as the holding motion, when the intensity of inner force applied to the inner portion of the steering wheel 200 is 'A', and the intensity of outer force applied to the outer portion of the steering wheel 200 is 'B', as in following table 1. The apparatus 100 may register the motion of the user as the holding motion in advance, when the intensity of inner force applied to the inner portion of the steering wheel 200 corresponds to a fifth section, and the intensity of outer force applied to the outer portion of the steering wheel 200 corresponds to a sixth section, as in following table 1. In this case, although there is the slight difference between 'A' and 'B', 'A' and 'B' have substantially the same value. The fifth and sixth sections of the force are adjacent to each other. Accordingly, it may be recognized that the intensities of force in the fifth and sixth sections are similar to each other.

The apparatus 100 may the motion of the user as the grasping motion, when force applied to both the inner portion and the outer portion of the steering wheel 200 is equal to or greater than reference force. The apparatus 100 may register the motion of the user as the grasping motion in advance, when the intensity of inner force applied to the inner portion of the steering wheel 200 is 'C', and the intensity of outer force applied to the outer portion of the steering wheel 200 is 'D', as in following table 1. The apparatus 100 may register the motion of the user as the grasping motion in advance, when the intensity of inner force applied to the inner portion of the steering wheel 200 corresponds to a seventh section, and the intensity of outer force applied to the outer portion of the steering wheel 200 corresponds to a ninth section, as in following table 1. In this case, although there is the slight difference between 'A.' and 'B', 'A' and 'B' have substantially the same value. The fifth and sixth sections of the force are adjacent to each other. Accordingly, it may be recognized that the intensities of force corresponding to the fifth and sixth sections are similar to each other. In this case, 'A', which is a value registered in the holding motion, may be set to be smaller than 'C' which is a value registered in the grasping motion, and 'B' may be set to be smaller than 'D'. In other words, the intensity of force in the grasping motion may be set to smaller than the intensity of force in the holding motion.

The apparatus 100 may recognize the motion of the user as the pushing motion when the force applied to the outer portion of the steering wheel 200 becomes relatively or absolutely greater than the force applied to the inner portion of the steering wheel 200, and may recognize the motion of the user as the pulling motion, when the force applied to the inner portion of the steering wheel becomes relatively or absolutely greater than the force applied to the outer portion of the steering wheel 200.

The apparatus 100 may register the motion of the user as the pushing motion in advance, when the intensity of inner force applied to the inner portion of the steering wheel 200 is 'E', and the intensity of outer force applied to the outer portion of the steering wheel 200 is 'F', as in following table 1. The apparatus 100 may register the motion of the user as the pulling motion in advance, when the intensity of inner force applied to the inner portion of the steering wheel 200 is 'G', and the intensity of outer force applied to the outer portion of the steering wheel 200 is 'H', as in following table 1. The apparatus 100 may register the motion of the user as the pushing motion in advance, when the intensity of inner force applied to the inner portion of the steering wheel 200 corresponds to a first section, and the intensity of outer force applied to the outer portion of the steering wheel 200 corresponds to a ninth section, as in following table 1. Meanwhile, the apparatus 100 may register the motion of the user as the pulling motion in advance, when the intensity of inner force applied to the inner portion of the steering wheel 200 corresponds to an eighth section, and the intensity of outer force applied to the outer portion of the steering wheel 200 corresponds to a zero section.

In this case, the difference the intensity of force between 'E' and 'F' is significantly greater than the difference the intensity of force between 'G' and 'H'. The apparatus 100 may recognize the motion of the user as the pulling motion when the force applied to the inner portion of the steering wheel 200 has a significantly great value, and may recognize the motion of the user as the pushing motion when the force applied to the outer portion of the steering wheel 200 has a significantly great value.

TABLE 1

| Hold | Grasp | Push | Pull |
| --- | --- | --- | --- |
| Inner force: A | Inner force: C | Inner force: E | Inner force: G |
| Outer force: B | Outer force: D | Outer force: F | Outer force: H |
| Inner force: fifth section | Inner force: seventh section | Inner force: first section | Inner force: eighth section |
| Outer force: sixth section | Outer force: ninth section | Outer force: ninth section | Outer force: zero section |

Meanwhile, the apparatus 100 may register the intensity of force for the holding motion, grasping motion, pushing motion, or pulling motion, and correct the intensity of force in the holding motion using a weight, based on the intensity of force registered with respect to each motion as in the following table 1. In this case, the apparatus 100 may set the weight for correction in advance through the tuning of the physical sensor.

TABLE 2

| Hold (correction principle)<br>(w1, w2, w3) | Hold (correction result)<br>(w1 = 1, w2 = 2, w3 = 3) |
|---|---|
| If (pushing inner forth ><br>holding inner force) maintain<br>holding section | Inner force: A (FIFTH section)<br>Outer force: b(SIXTH SECTION) |
| If (pushing inner force <<br>holding inner force) expand<br>holding section:<br>(pushing inner force *w1 +<br>holding inner force *w2)/w3 | Inner force: A(fifth section)<br>→ 33-53 (third section to<br>fifth section),<br>* (13 + 53)/2 = 33(third section)<br>Outer force: B(sixth section) |
| If (pulling outer force ><br>holding outer force) maintain<br>holding section | Inner forth: A (fifth section)<br>Outer force: B (sixth section) |
| If (pulling outer force <<br>holding outer force) expand<br>holding section:<br>(pulling outer force *w1 +<br>holding outer force *w2)/w3 | Inner force: A (fifth section)<br>Outer force: B (sixth section)<br>→ 35-67 (third section to<br>sixth section)<br>* (3 + 67)/2 = 35 (third section) |

As illustrated in table 2, the apparatus 100 may maintain the registered section of the force of the holding motion, when the registered inner force in the pushing motion is greater than the registered inner force in the holding motion. For example, the apparatus 100 may maintain the registered section of force for recognizing the holding motion without correction, when the registered inner force in the pushing motion is greater than the registered inner force in the holding motion, and when the inner force in the holding motion corresponds to the fifth section, and the outer force in the holding motion corresponds to the sixth section.

To the contrary, the apparatus 100 may expand a holding section as in Equation 1 using a preset weight, when the inner force in the pushing motion is less than the inner force in the holding motion. In this case, the apparatus 100 may be set weights of 'w1', 'w2', and 'w3' through experimental values in advance.

$$\text{Holding correction value} = (\text{pushing inner force}*w1 + \text{holding inner force}*w2)/w3 \quad \text{Equation 1}$$

In addition, the apparatus 100 may maintain a section of the registered force of the holding operation when the outer force in the pulling motion is greater than the outer force in the holding motion.

Meanwhile, the apparatus 100 may expand a holding section using a weight as in Equation 2, when the outer force in the pulling motion is less than the outer force in the holding motion.

$$\text{Holding correction value} = (\text{pulling outer force}*w1 + \text{holding outer force}*w2)/w3 \quad \text{Equation 2}$$

Figure 5:
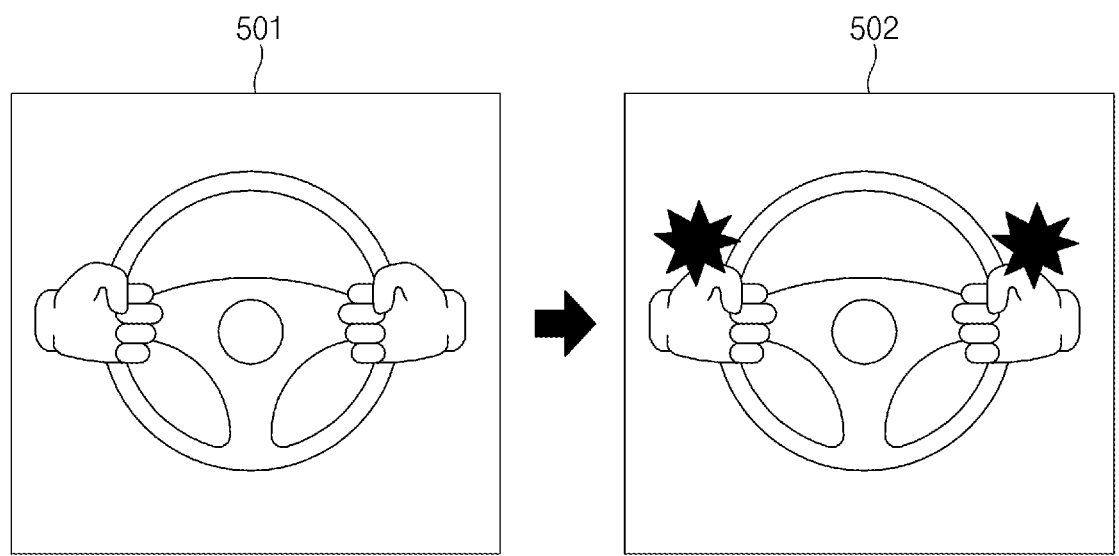
FIG. 5 is a view illustrating a showing that a start time point of voice recognition is recognized, according to an embodiment of the present disclosure.

FIG. 5 is a view illustrating a showing that a start time point of voice recognition is recognized, according to an embodiment of the present disclosure.

Referring to FIG. 5, the apparatus 100 may recognize that the voice recognition is started, when a user shifts a state 501 of the holding motion of the steering wheel 200 to a state 502 of the grasping motion of the steering wheel 200 during driving.

Figure 6:
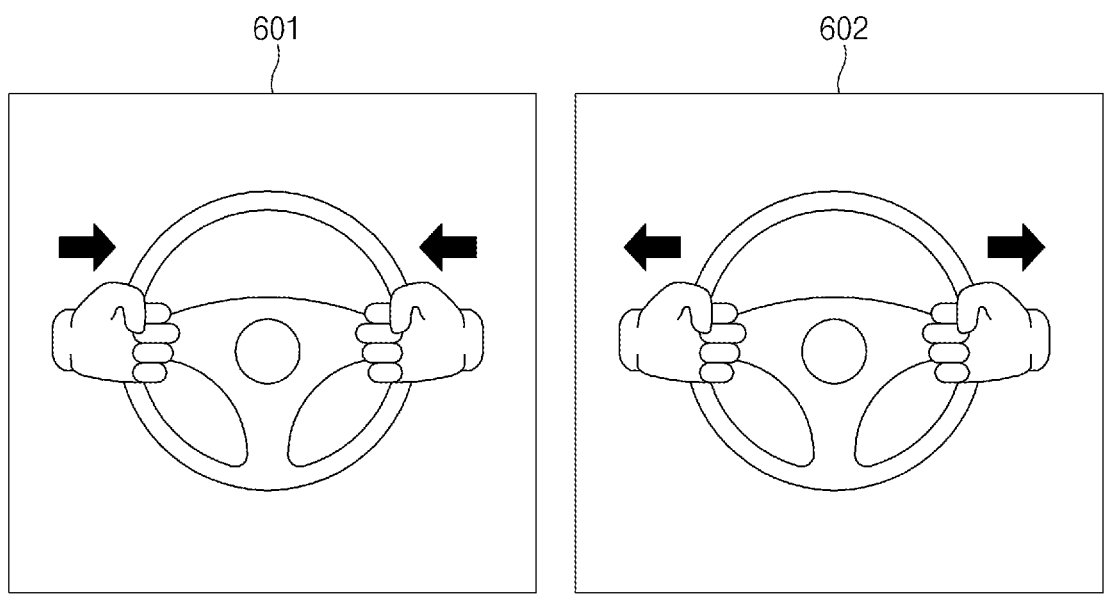
FIG. 6 is a view illustrating a showing of a response "Yes" or "No" according to another embodiment of the present disclosure.

FIG. 6 is a view illustrating a showing of the response "Yes" or "No" according to another embodiment of the present disclosure.

Referring to FIG. 6, the apparatus 100 may recognize the motion of the user as "Yes" when receiving an input of the pushing motion from the user as in reference numeral 601, and recognize the motion of the user as "No" when receiving an input of the pulling motion from the user as in reference numeral 602, when requesting the user to make a response of "Yes" or "No" as a feedback of voice recognition.

Figure 7:
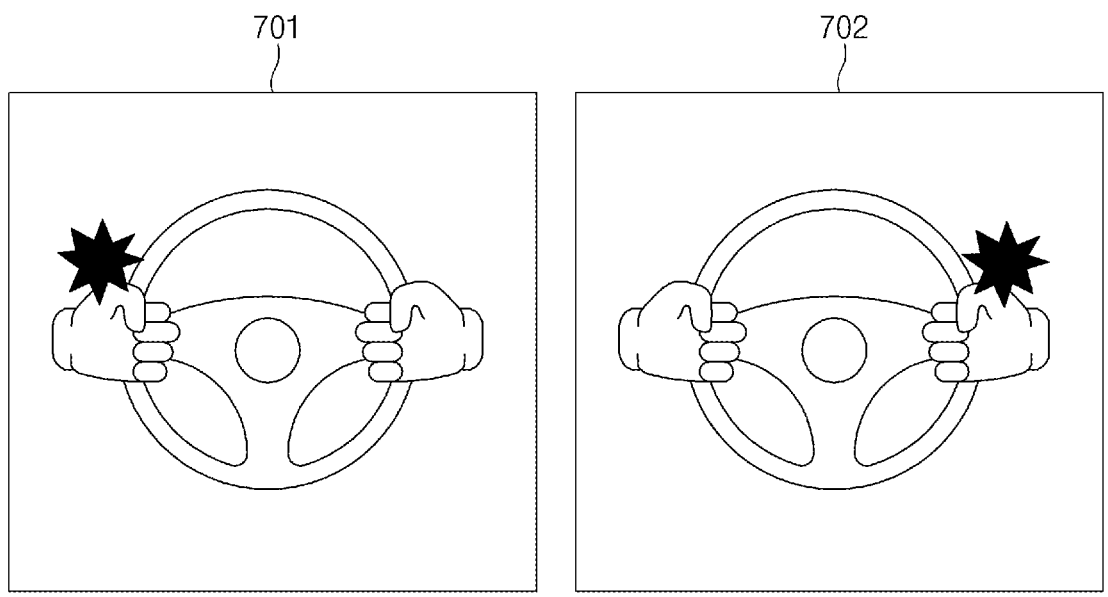
FIG. 7 is a view illustrating a showing of level control according to another embodiment of the present disclosure.

FIG. 7 is a view illustrating a showing of level control according to another embodiment of the present disclosure.

Referring to FIG. 7, the apparatus 100 may recognize the motion of the user as "decrease" when receiving an input of a motion of grasping a left side from the user as in reference numeral 701, and recognize the motion of the user as "increase" when receiving an input of a motion of grasping a right side from the user as in reference numeral 702, when requesting the user to perform level control as a feedback of voice recognition. In this case, the level control may include volume control, screen brightness control, lighting control, sunroof open control, window open control, or album flip control.

The apparatus 100 terminates a level control mode when receiving an input of a motion of grasping both sides of the steering wheel 200 from the user after the level control is finished by grasping one side of the steering wheel 200.

Figure 8:
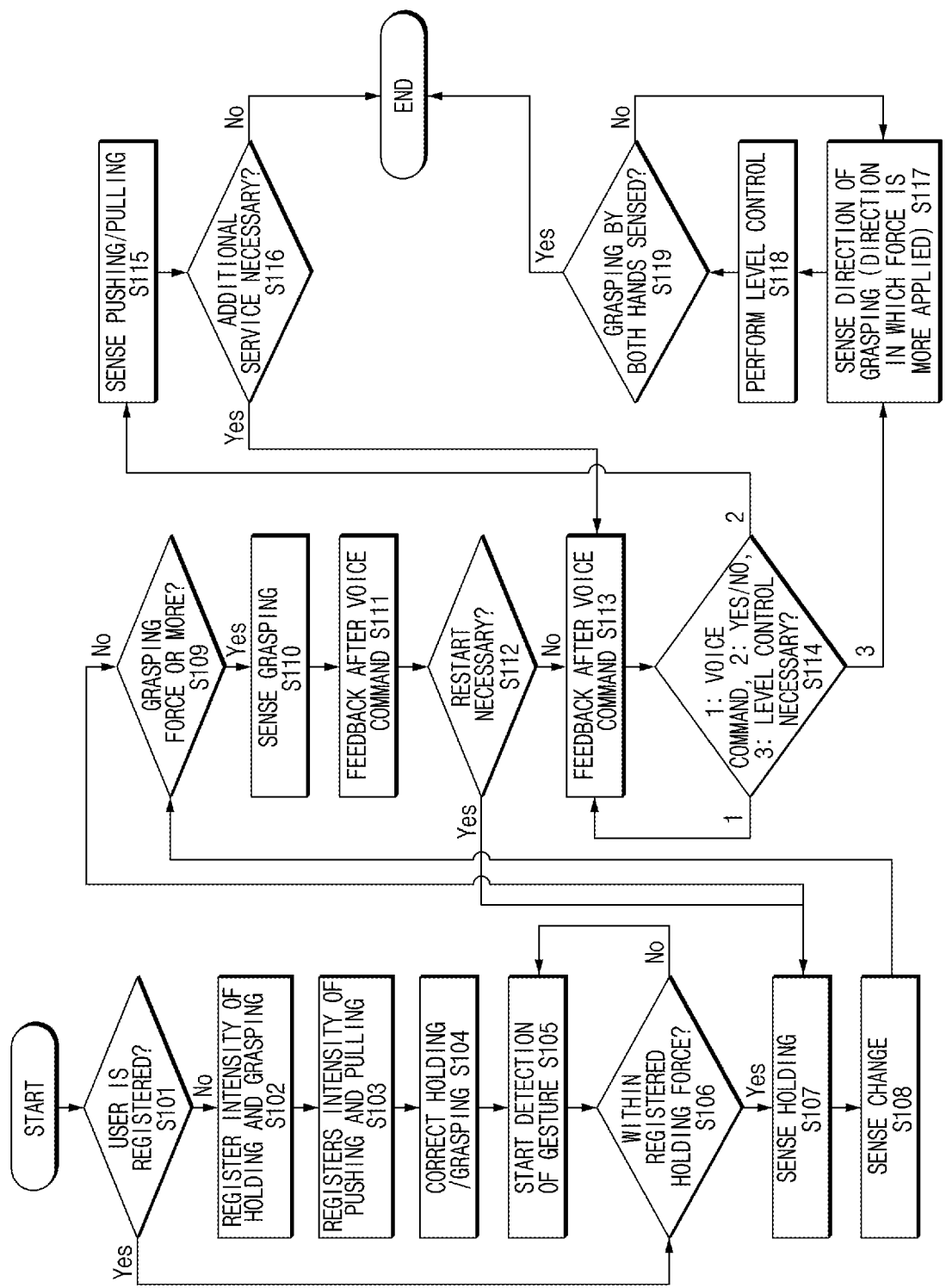
FIG. 8 is a flowchart illustrating a method for inputting a vehicle command, according to an embodiment of the present disclosure.

Hereinafter, a method for inputting a vehicle command will be described in detail with reference to FIG. 8 according to an embodiment of the present disclosure. FIG. 8 is a flowchart illustrating a method for inputting a vehicle command according to an embodiment of the present disclosure.

Hereinafter, it is described that the vehicle command input apparatus 100 of FIG. 1 performs a process of FIG. 8. In addition, in the description made with reference to FIG. 8, it may be understood that operations described as being performed by an apparatus are controlled by the processor 140 of the vehicle command input apparatus 100.

Referring to FIG. 8, the vehicle command input apparatus 100 determines whether a user is registered (S101). In other words, the vehicle command input apparatus 100 determines whether the user is registered by determining whether an intensity (constant or section) of force for a holding motion, a grasping motion, a pushing motion, and a pulling motion of the steering wheel 200 is registered with respect to each user.

When the user is not registered, the apparatus 100 registers the intensities of the holding and grasping motions (S102), and registers the intensities of the pushing and pulling motions (S103). Then, the vehicle command input apparatus 100 may correct the registered intensity of force for the holding motion or the grasping motion using the registered intensity of force of the holding motion, the grasping motion, the pushing motion, or the pulling motion (S104).

As described above, when the registration and the correction for each motion are complemented, the vehicle command input apparatus 100 starts the detection of a gesture (S105).

The vehicle command input apparatus 100 determines whether the intensity of the force applied to the steering wheel by the user satisfies the registered intensity for the force for the holding motion (S106).

The vehicle command input apparatus 100 recognizes the motion of the user as the holding motion when the intensity of the force applied to the steering wheel by the user satisfies the registered intensity for the force for the holding motion (S107). Thereafter, when sensing the change in intensity of force applied to the steering wheel 200 as the change in the intensity of the force applied to the steering wheel 200 is continuously monitored (S108), the vehicle command input apparatus 100 determines whether the intensity of force applied to the steering wheel by the user satisfies the registered intensity of force for the grasping motion (S109).

The vehicle command input apparatus 100 recognizes the motion of the user as the grasping motion when the intensity of the force applied to the steering wheel by the user satisfies the registered intensity for the force for the grasping motion (S110). Accordingly, the vehicle command input apparatus 100 recognizes that a starting point for voice recognition comes, outputs a signal sound for starting the voice recognition, receives and recognizes a voice command from the user, and performs a feedback for the recognized voice command (S111). In this case, the signal sound for starting the voice recognition may be output through the interface 130.

For example, when the user inputs a voice command of "turn on an air conditioner" after grasping the steering wheel, the apparatus 100 may provide a feedback of "please, regulate the temperature of the air conditioner". Accordingly, the user may decrease or increase the temperature of the air conditioner by regulating force applied to the steering wheel.

For example, when the user inputs a voice command of "turn on a navigation" after grasping the steering wheel, the apparatus 100 may provide a feedback of "please, input a destination". In this case, the user may input a destination through the voice command.

For example, when the user inputs a voice command of "lighting is dark" after grasping the steering wheel, the apparatus 100 may provide a feedback of "Shall I light on?". In this case, the user may make a response of "Yes" or "No" by pushing or pulling the steering wheel, and the apparatus 100 may recognize "Yes" or "No", depending on pressure applied to the steering wheel 200.

In addition, when the apparatus 100 provides a feedback of "request a voice command again", the user may start voice recognition again after performing the grasping motion for the steering wheel 200.

The vehicle command input apparatus 100 determines whether to receive a voice command, whether to receive "Yes" or "No", or whether to receive a level control, depending on a feedback for the voice command.

The vehicle command input apparatus 100 provides a feedback again by receiving a voice command from the user (S113) when a voice command input is necessary (1 in S114), and senses the pushing motion or the pulling motion of the steering wheel 200 (S115) when the input of the response of "Yes" or "No" is necessary (2 in S114). Thereafter, the apparatus 100 determines whether an additional service is necessary to be provided. The apparatus 100 returns to S113 when the additional service is necessary to be provided, and terminates the process when the additional service is not necessary.

In addition, when a level control input is necessary (3 in S114), the vehicle command input apparatus 100 performs the level control by recognizing a level control command depending on the intensity of force applied to a right side and a left side of the steering wheel (S117 and S118).

Thereafter, the vehicle command input apparatus 100 determines whether the grasping motion of the steering wheel 200 by both hands is sensed (S119) and determines that the level control command is completed, when the grasping motion by both hands is sensed.

The apparatus 100 may stop detecting gestures when a restriction situation occurs during S101 to S119, may stand by at a time point in which the detection of the gestures is stopped, and may return an initial step (S101) of inputting the gesture, when the restriction situation is maintained for a specific time or more.

Figure 9:
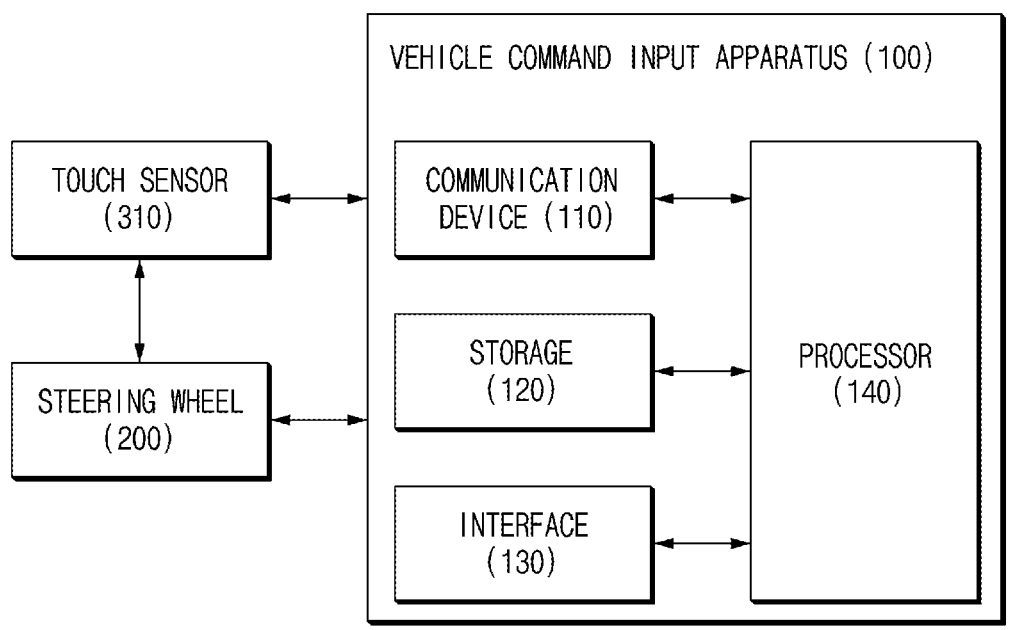
FIG. 9 is a block diagram illustrating a structure of a vehicle system including an apparatus for inputting a vehicle command, according to an embodiment of the present disclosure.

FIG. 9 is a block diagram illustrating a structure of a vehicle system including an apparatus for inputting a vehicle command, according to another embodiment of the present disclosure.

FIG. 9 discloses a configuration of recognizing a gesture using a contact area with a user hand making contact with a steering wheel by providing a touch sensor 310 instead of the pressure sensor 300. For example, the apparatus 100 may start voice recognition when the contact area with the user hand is equal to or greater than a predetermined reference value, may recognize "Yes" when the user hand makes contact with the inner portion of the steering wheel, and may recognize "No" when the user hand makes contact with the outer portion of the steering wheel. In addition, the apparatus 100 may perform the level control by varying the contact area in the state that the user hand makes contact with one side of the steering wheel.

As described above, according to the present disclosure, the operation (gesture) is recognized depending on the intensity of force to hold the steering wheel for the vehicle, and the vehicle command is recognized depending on the relevant operation, so the vehicle command is exactly recognized even in the state in which the user listens to music inside the vehicle or opens the window.

In addition, according to the present disclosure, the recognition of the gesture is stopped when the signal related to the safety or the danger of the vehicle is generated, thereby enhancing the safety of the vehicle.

Further, according to the present disclosure, when the user does not hold the steering wheel during driving, a warning is provided to the user to guide safe driving.

According to the present disclosure, the intent of a user may be apparently determined, as the user is able to exactly input the vehicle command without the additional hand motion while holding the steering wheel for the vehicle.

In addition, according to the present disclosure, the safety of the vehicle may be enhanced by allowing the user to stop or restart inputting the vehicle command when inputting the vehicle command through the steering wheel and when the signal related to vehicle safety or danger is generated.

Besides, a variety of effects directly or indirectly understood through the disclosure may be provided.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for inputting a vehicle command, the apparatus comprising:
 a storage configured to store an algorithm; and a processor configured to execute the algorithm to recognize a motion of a user based on an intensity of force applied to a steering wheel, and to recognize and execute the vehicle command based on the motion of the user, wherein the storage is further configured to store data processed by the processor, wherein the processor is configured to:
- recognize the steering wheel as being in a holding state in which the steering wheel is held by a hand of the user, when force applied to an inner portion or an outer portion of the steering wheel satisfies a preset first condition; and
- recognize the steering wheel as being in a grasping state in which the steering wheel is grasped by the hand of the user, when force, which are simultaneously applied to the inner portion and the outer portion of the steering wheel by both hands, satisfies a preset second condition, wherein the second condition is set to have a value greater than the first condition in intensity of the force.

2. The apparatus of claim 1, wherein the processor is configured to:
perform at least one of starting a voice recognition service, ending the voice recognition service, controlling an operation and a level of a vehicle device, or responding to the voice recognition service, based on the motion of the user.

3. The apparatus of claim 1, wherein the motion of the user includes at least one of a holding motion, a grasping motion, a pushing motion, a pulling motion, a motion of holding one side, or a motion of holding in a preset pattern.

4. The apparatus of claim 1, wherein the processor is configured to:
recognize the steering wheel as being in the holding state in which the steering wheel is held by the hand of the user, when the force applied to the inner portion or the outer portion of the steering wheel is sensed through both hands or one hand.

5. The apparatus of claim 1, wherein the processor is configured to:
perform at least one of starting a voice recognition service, ending the voice recognition service, controlling an operation and a level of a vehicle device, or responding to the voice recognition service, when the steering wheel is recognized as being in the grasping state.

6. The apparatus of claim 5, wherein the processor is configured to:
end a function or a service, which is being performed, when the steering wheel is recognized as being in the grasping state.

7. The apparatus of claim 1, wherein the processor is configured to:
- recognize the motion of the user as a pulling motion, when force applied to an inner portion of the steering wheel is greater than force applied to an outer portion of the steering wheel; and
- recognize the motion of the user as a pushing motion, when the force applied to the outer portion of the steering wheel is greater than the force applied to the inner portion of the steering wheel.

8. The apparatus of claim 7, wherein the processor is configured to:
recognize the pulling motion and the pushing motion by matching the pulling motion and the pushing motion with "Yes" or "No" in a voice recognition service.

9. The apparatus of claim 1, wherein the processor is configured to:
perform level control in a state that grasping one side of the steering wheel is performed.

10. The apparatus of claim 9, wherein the processor is configured to:
- perform level down control when the grasping of the one side of the steering wheel is performed; and
- perform level up control when grasping another side of the steering wheel opposite to the one side is performed.

11. The apparatus of claim 9, wherein the level control includes:
at least one of volume control, screen brightness control, lighting control, sunroof open control, window open control, or album flip control.

12. The apparatus of claim 1, wherein the processor is configured to:
perform a control operation to stop or restart inputting the vehicle command through the steering wheel, when a signal related to vehicle safety or danger is generated or when a steering wheel input value for sudden acceleration/deceleration or sudden rotation is sharply increased in inputting the vehicle command through the steering wheel.

13. The apparatus of claim 1, wherein the processor is configured to:
perform a control operation to output a warning when at least one holding motion is not recognized with respect to the steering wheel.

14. The apparatus of claim 1, wherein the processor is configured to:
register a condition for each motion of the user by setting the condition based on the intensity of force applied to the steering wheel with respect to the motion of the user.

15. The apparatus of claim 14, wherein the processor is configured to:
set the condition as a constant or a section.

16. The apparatus of claim 14, wherein the processor is configured to:
correct a condition registered for a holding motion of the motion of the user, based on the condition registered with respect to each motion of the user and a preset weight.

17. A vehicle system comprising:
- a steering wheel of a vehicle;
- a pressure sensor configured to sense pressure applied to the steering wheel; and
- a vehicle command input apparatus configured to recognize a motion of a user based on an output of the pressure sensor, and to recognize and execute a vehicle command based on the motion of the user, wherein the vehicle command input apparatus is configured to:
- recognize the steering wheel as being in a holding state in which the steering wheel is held by a hand of the user, when force applied to an inner portion or an outer portion of the steering wheel satisfies a preset first condition; and
- recognize the steering wheel as being in a grasping state in which the steering wheel is grasped by the hand of the user, when force, which are simultaneously applied to the inner portion and the outer portion of the steering wheel by both hands, satisfies a preset second condition, wherein the second condition is set to have a value greater than the first condition in intensity of the force.

18. The vehicle system of claim 17, wherein the pressure sensor includes:
a first sensor mounted at an inner portion of the steering wheel; and
a second sensor mounted at an outer portion of the steering wheel.

19. A method for inputting a vehicle command, the method comprising:
sensing intensity of force applied to a steering wheel;
recognizing a motion of a user based on the intensity of the force applied to the steering wheel; and
executing the vehicle command by recognizing the vehicle command based on the motion of the user,
wherein the recognizing a motion of a user based on the intensity of the force applied to the steering wheel includes;
recognizing the steering wheel as being in a holding state in which the steering wheel is held by a hand of the user, when force applied to an inner portion or an outer portion of the steering wheel satisfies a preset first condition; and
recognizing the steering wheel as being in a grasping state in which the steering wheel is grasped by the hand of the user, when force, which are simultaneously applied to the inner portion and the outer portion of the steering wheel by both hands, satisfies a preset second condition,
wherein the second condition is set to have a value greater than the first condition in intensity of the force.

* * * * *